(12) United States Patent  
Roth et al.

(10) Patent No.: US 8,517,470 B2
(45) Date of Patent: Aug. 27, 2013

(54) FITTING SYSTEM FOR A VEHICLE SEAT

(75) Inventors: Michael Roth, Sembach (DE); Gerhard Schäfer, Rockenhausen (DE); Peter Thiel, Remscheid (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 367 days.

(21) Appl. No.: 12/951,809

(22) Filed: Nov. 22, 2010

(65) Prior Publication Data

US 2011/0121629 A1     May 26, 2011

(30) Foreign Application Priority Data

Nov. 26, 2009   (DE) .................. 10 2009 056 397

(51) Int. Cl.  
*B60N 2/02*         (2006.01)

(52) U.S. Cl.  
USPC .............. 297/362.12; 297/378.1; 297/354.1

(58) Field of Classification Search  
USPC .................. 297/378.1, 378.12, 354.1, 261.1, 297/362.12  
See application file for complete search history.

(56) References Cited

U.S. PATENT DOCUMENTS

| 4,629,251 | A | * | 12/1986 | Tezuka | .......................... 297/362 |
| 5,553,922 | A | * | 9/1996 | Yamada | ......................... 297/362 |
| 5,820,218 | A | | 10/1998 | Baloche et al. | |
| 6,454,354 | B1 | | 9/2002 | Vossmann et al. | |
| 6,799,806 | B2 | | 10/2004 | Eppert et al. | |
| 7,520,568 | B2 | | 4/2009 | Hoshihara et al. | |
| 7,571,962 | B2 | | 8/2009 | Thiel et al. | |
| 7,571,963 | B2 | | 8/2009 | Peters et al. | |
| 7,673,943 | B2 | * | 3/2010 | Ohta et al. | ............... 297/362.11 |

FOREIGN PATENT DOCUMENTS

| DE | 4439644 | 6/1995 |
| DE | 102005046807 | 11/2006 |
| DE | 102006044490 | 8/2007 |
| DE | 102006041917 | 1/2008 |
| EP | 0705727 | 4/1996 |
| WO | WO0044582 | 8/2000 |
| WO | WO2009143999 | 12/2009 |

\* cited by examiner

*Primary Examiner* — Sarah B McPartlin  
(74) *Attorney, Agent, or Firm* — McGlew and Tuttle, P.C.

(57) ABSTRACT

A fitting system (5) for a vehicle seat (1) includes a first fitting (10), a second fitting (50), a first transmission element (7) acting between the two fittings (10, 50), a free-pivoting device (54) assigned to the second fitting (50), a first operating element for adjusting the inclination, with the actuation thereof the two fittings (10, 50) being unlocked by using the first transmission element (7), and a second operating element for free pivoting. With the actuation of the second operating element, the first fitting (10) and the free-pivoting device (54) are unlocked. A second transmission element (80) is arranged between the two fittings (10, 50) and mounted on the fittings (10, 50), and which—independently of the first transmission element (7)—acts between the free-pivoting device (54) and the first fitting (10).

20 Claims, 6 Drawing Sheets

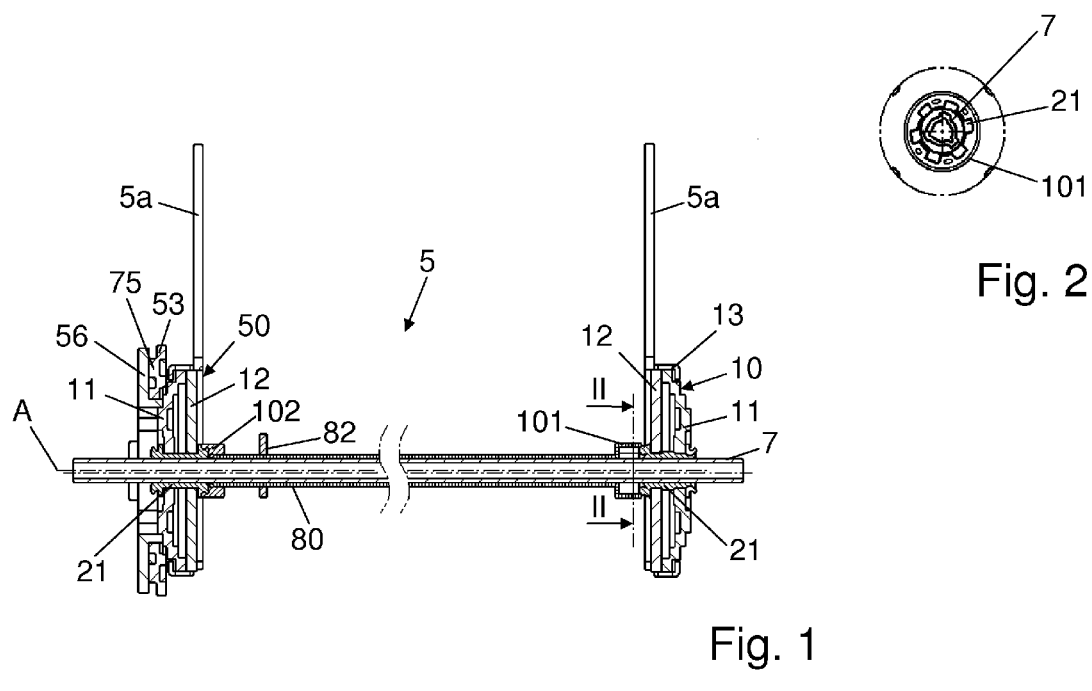

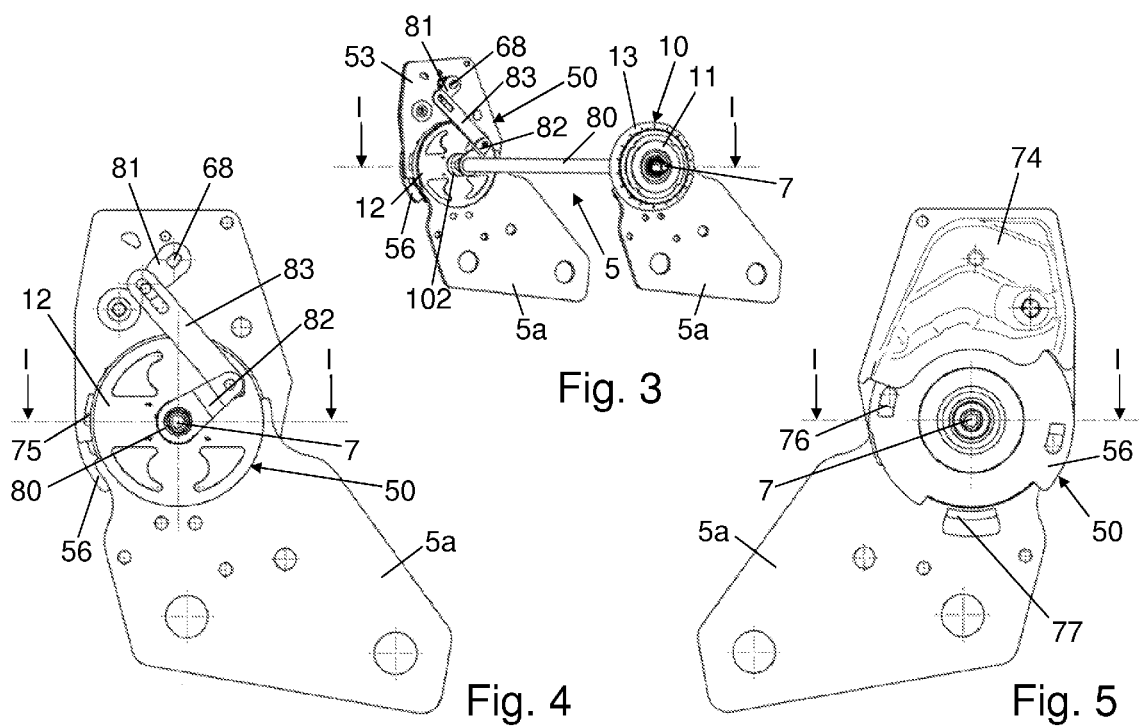

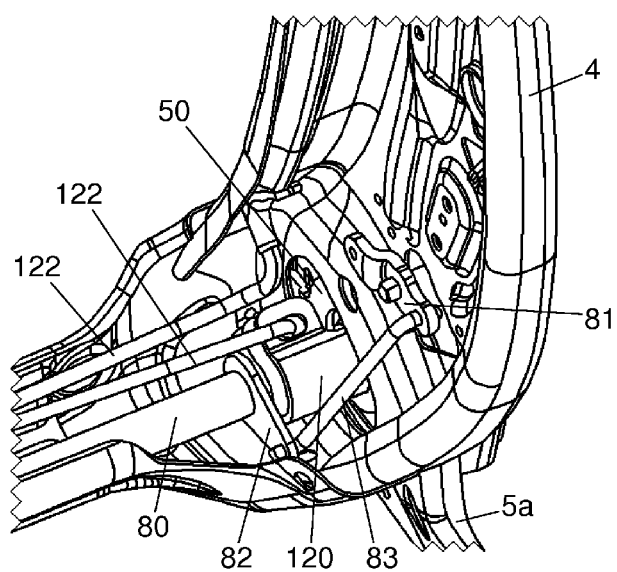
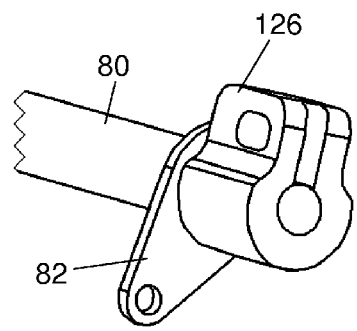
Fig. 9
Fig. 10

FITTING SYSTEM FOR A VEHICLE SEAT

CROSS REFERENCE TO RELATED APPLICATIONS

This application claims the benefit of priority under 35 U.S.C. §119 of German Patent Application DE 10 2009 056 397.0 filed Nov. 26, 2010, the entire contents of which are incorporated herein by reference.

FIELD OF THE INVENTION

The invention relates to a fitting system for a vehicle seat with the fitting system comprising a first fitting, a second fitting, a first transmission element acting between the two fittings, a free-pivoting device assigned to the second fitting, a first operating element for adjusting the inclination of the backrest, with the actuation thereof the two fittings being unlocked by using the first transmission element, and comprising a second operating element for free pivoting of the backrest, with the actuation thereof the first fitting and the free-pivoting device being unlocked.

BACKGROUND OF THE INVENTION

A fitting system of this type is disclosed in EP 0 705 727 B1 (corresponding to U.S. Pat. No. 5,820,218) comprising a first fitting, a second fitting and a transmission element which acts between the two fittings. Each fitting comprises a shaft piece, the rotation thereof unlocking the fitting. For adjusting the inclination of a backrest, the shaft piece is rotated by means of a first operating element on the second fitting, and a first lever located fixedly in terms of rotation thereon is pivoted. The first lever drives a second lever, which is connected fixedly in terms of rotation to the transmission element. The pivoting second lever rotates the transmission element, said second lever transmitting the rotational movement to the shaft piece of the first fitting. Both fittings are unlocked. For freely pivoting the backrest, a free-pivoting device is associated with the second fitting, said free-pivoting device being locked by means of a pivotable pawl. The pawl is opened by means of a second operating element, the pivoting-open pawl pivoting the second lever by means of a cable pull. The pivoting second lever rotates the transmission element, said second lever transmitting the rotational movement to the shaft piece of the first fitting. The first fitting is unlocked while the second fitting remains locked. The backrest inclination is memorized by means of the disclosed fitting system. When freely pivoting and subsequently pivoting back the backrest, the previously set backrest inclination is again adopted.

SUMMARY OF THE INVENTION

The object of the invention is to improve a fitting system of the aforementioned type, in particular to design the fitting system more simply and cost-effectively.

According to the invention, a fitting system for a vehicle seat is provided with the system comprising a first fitting, a second fitting, a first transmission element acting between the two fittings, a free-pivoting device assigned to the second fitting, a first operating element for adjusting the inclination, with the actuation thereof the two fittings being unlocked by using the first transmission element, and comprising a second operating element for free pivoting, with the actuation thereof the first fitting and the free-pivoting device being unlocked. Between the two fittings a second transmission element is arranged and mounted on the fittings. The second transmission element acts independently of the first transmission element between the free-pivoting device and the first fitting.

As a second transmission element is arranged spatially between the two fittings and is mounted on the fittings, said second transmission element acting—independently of the first transmission element—between the free-pivoting device and the first fitting, the first fitting may be unlocked without the first transmission element unlocking the second fitting. When freely pivoted, therefore, the second fitting remains locked and thus stores the previously set inclination (memory function). The fitting system according to the invention is intended for a vehicle seat, the backrest inclination thereof being intended to be able to be adjusted in a freely pivotable manner and memorized, but at the same time said fitting system is intended to have lower manufacturing costs, which is achieved by the use of just one free-pivoting device in the fitting system. Preferably, a transmission rod and a transmission tube are provided as transmission elements, which in each case are of rigid configuration, the transmission tube enclosing the transmission rod.

The fittings preferably comprise fitting parts which are pivotable relative to one another about an axis, the transmission elements also being rotatable about the axis. Moreover, the fittings preferably comprise one respective drive element which is rotatable about the axis, and by means of the rotation thereof the associated fitting is unlocked, the two drive elements rotatably mounting at least the first transmission element about the axis. Overall, therefore, structurally neat and space-saving spatial relationships result.

As the drive element of the first fitting receives the first transmission element—which is coupled for take-up, free travel being provided between the drive element and the transmission element in one rotational direction, easy decoupling is provided. Overall, less constructional space is required, and the construction of the fitting system is simplified. The free travel is preferably greater than the unlocking path of the drive element which is necessary for unlocking the first fitting, so that the decoupling is complete.

In a preferred embodiment, the free travel, i.e. the decoupling, is implemented by a spline shaft profile between the first transmission element and the drive element of the first fitting, in the initial position longitudinal ribs of the transmission element and the edges of rib receivers of the drive element being spaced apart from one another in one rotational direction. Preferably, therefore, the transmission element and/or the drive element comprise a profile with trigonal symmetry. Such a profile is, for example, disclosed in DE 10 2006 041 917 B3, the disclosure thereof relative thereto being expressly included in the invention (and corresponding published application US2009021062 is hereby incorporated by reference in its entirety). The free travel which is present is preferably 30° and thus markedly greater than conventional clearance, which is provided for the purpose of tolerance compensation. However, alternative decoupling methods are also possible, for example by means of hooks and pins.

The second transmission element is preferably connected fixedly in terms of rotation—or at least coupled for take-up—to the drive element of the first fitting, for example by means of teeth or a positive connection. Optionally, the drive element is lengthened in the axial direction by using a drive element extension, to which the second transmission element is then connected. The second transmission element may be provided at its end with a widened portion, in order to produce the positive connection with the drive element.

On the second fitting, the second transmission element may be rotatably mounted on the drive element or directly on the second fitting. To this end, a suitable bushing, clip or other bearing element may be provided. It is also conceivable that the bearing is provided by the interposition of a separate bearing element, which for example is slotted in an axial manner, in order to simplify the mounting of the second transmission element.

The fitting system according to the invention is preferably configured so that, when actuating the first operating element, the first transmission element is rotated and, as a result, rotates both drive elements, whereby an adjustment of the inclination, for example of the backrest, is possible by means of the unlocked fittings, while when actuating the second operating element the first transmission element remains unrotated and the second transmission element rotates the drive element of the first fitting, whereby a free pivoting of the backrest is possible by means of the first unlocked fitting and the unlocked free-pivoting device.

The second operating element, which also acts on the free-pivoting device, may act by means of a lever mechanism on the second transmission element and control said second transmission element. For example, a first lever element may be provided as a lever mechanism, preferably a coupling element as an intermediate member, and a second lever element may be provided which are individually connected in a rigid and articulated manner to one another.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a sectional view through the first exemplary embodiment, according to the invention, along the line I-I in FIGS. 3, 4 and 5;

FIG. 2 is a detail view of the first exemplary embodiment along the line II-II in FIG. 1;

FIG. 3 is a perspective view of the first exemplary embodiment;

FIG. 4 is a side view of the side of the second fitting facing to the inside;

FIG. 5 is a side view of the side of the second fitting facing to the outside;

FIG. 9 is a perspective partial view of the second exemplary embodiment in the region of the second fitting;

FIG. 10 is a perspective view of the end of the second transmission element mounted on the second fitting;

DESCRIPTION OF THE PREFERRED EMBODIMENTS

Figure 6:
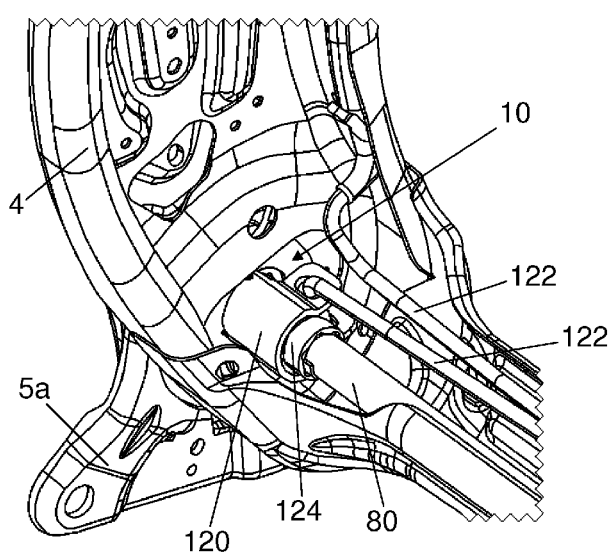
FIG. 6 is a perspective partial view of the second exemplary embodiment in the region of the first fitting.
Figure 8:
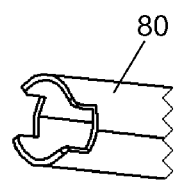
FIG. 8 is a perspective view of the end of the second transmission element mounted on the first fitting.
Figure 7:
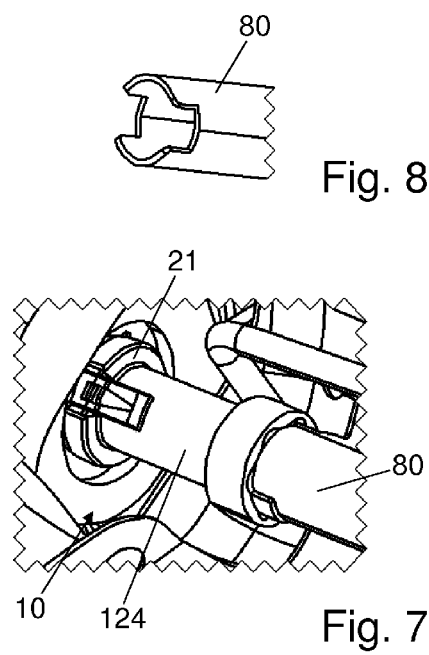
FIG. 7 is a partial view of FIG. 6 without the clip on the first fitting.
Figure 11:
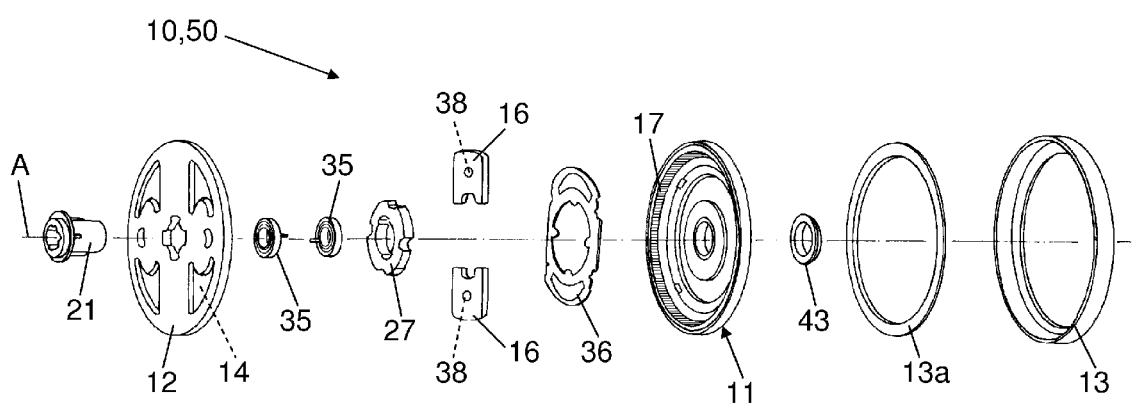
FIG. 11 is an exploded view of the first or second fitting.
Figure 12:
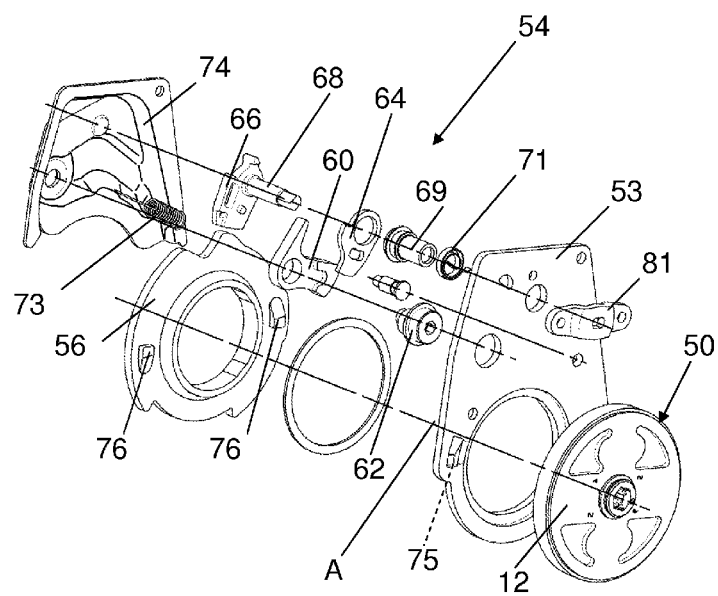
FIG. 12 is an exploded view of the free-pivoting device on the second fitting.

Referring to the drawings in particular, a vehicle seat 1, which in the present case is provided as a front seat of a motor vehicle, comprises a seat part 3 and a backrest 4. By means of a fitting system 5, the backrest 4 may be adjusted, on the one hand, in its inclination relative to the seat part 3, whereby a plurality of use positions are defined, and on the other hand may be freely pivoted, i.e. pivotable to the front into a non-use position, in order to facilitate access to a rear seat row, for example. The inclination adjustment and the (central) free pivoting are carried out about a common axis A, which defines a subsequently used cylindrical coordinate system. A transmission rod 7 is provided aligned with the axis A and rotatable about said axis, said transmission rod being arranged horizontally in the transmission region between the seat part 3 and the backrest 4. The fitting system 5 has one fitting on each vehicle seat side, which are both constructed and coupled in the manner described below.

A first fitting 10 of the fitting system 5 is configured as a latching fitting, in which a first fitting part 11 and a second fitting part 12 may be locked to one another, and after unlocking are rotatable relative to one another about the axis A, as disclosed in, for example, WO 00/44582 A1 (corresponding to U.S. Pat. No. 6,454,354).

The two fitting parts 11 and 12 may be inscribed in each case approximately in a circular disc shape. The two fitting parts 11 and 12 are produced in a manner disclosed below.

For receiving the axially acting forces, i.e. for holding together the fitting parts 11 and 12, a clamping ring 13 is provided. The process of being held together in such a manner by means of a clamping ring is, for example, disclosed in U.S. Pat. No. 6,799,806 A. The preferably metal clamping ring 13 is fixedly connected to one of the two fitting parts 11 and 12, which are also preferably of metal, for example to the second fitting part 12, and preferably welded or crimped—by encompassing the fitting part connected thereto. On its front face, the clamping ring 13 comprises an edge facing radially inwards, by means of which, optionally by the interposition of a separate slide ring 13a, it encompasses radially outwardly the other of the two fitting parts 11 and 12, for example the first fitting part 11, without hindering the relative movement o the two fitting parts 11 and 12. From a structural point of view, the two fitting parts 11 and 12, therefore, form together (with the clamping ring 13) a disc-shaped unit.

The second fitting part 12 has—in the present case four—guide segments 14, which with straight guide surfaces laterally guide in pairs one respective bolt 16 in the radial direction. The bolts 16—in the present case a total of two—are offset relative to one another—in the present case by respectively 180°—in a constructional space defined between the two fitting parts 11 and 12. The bolts 16 are provided on their radially outwardly located end with teeth, which may be brought into engagement with (drop into) a toothed ring 17 of the first fitting part 11 configured as a ring gear. When the toothed ring 17 and the bolts 16 cooperate, the first fitting 10 is locked. The guide segments 14 bear against the toothed ring 17 of the first fitting part 11 with, in each case, a (cylindrically) curved bearing surface, whereby the two fitting parts 11 and 12 bear against one another.

A drive element 21, for example made of plastics, is arranged in the center of the first fitting 10, said drive element being mounted rotatably on at least one of the two fitting parts 11 and 12, in the present case the first fitting part 11, more specifically in a central opening thereof. The drive element 21, which has a hub with a central bore about the axis A, is located on the transmission rod 7 coupled for take-up. To this end, the transmission rod 7 has a profile with trigonal symmetry with three longitudinal ribs offset relative to one another in the peripheral direction respectively by 120°, which engages in one respective rib receiver of the hub of the drive element 18. Between the transmission rod 7 and the drive element 21, the free travel (the "decoupling angle") is provided in one rotational direction, i.e. in the initial position the longitudinal ribs and the edge of the rib receivers are spaced apart from one another by a specific angle—in the present case by approximately 30°. In the initial position, no free travel is provided in the other rotational direction. Thus, rotational movement may be transmitted in both rotational directions, limited free travel being provided in one rotational direction.

An eccentric 27 is located fixedly in terms of rotation on the drive element 21 or at least coupled for take-up, said eccentric being arranged in the constructional space defined between the fitting parts 11 and 12. A spring arrangement 35, for example two spiral springs, is arranged and supported in or on one of the two fitting parts 11 and 12, in the present case the second fitting part 12. The spring arrangement 35 acts on the eccentric 27. A spring arrangement 35 with two spiral springs nested in one another is, for example, disclosed in DE 10 2005 046 807 B3 (corresponding to U.S. Pat. No. 7,571,963). The eccentric 27 acted upon by the spring arrangement 35 acts on the radially movable bolts 16 and impinges on said bolts, so that they are forced radially outwardly, in order to engage in the toothed ring 17, whereby the fitting 10 is locked.

A control disc 36 is axially arranged in the constructional space between the bolts 16 and the first fitting part 11 and is located in the present case fixedly in terms of rotation on the eccentric 27. The control disc 36 has—in the present case two—control paths, which in each case cooperate with a lug 38 of each bolt 16. The lugs 38 thus protrude in the axial direction from the bolts 16 associated therewith. The drive element 21 is axially secured by a locking ring 43 which, when mounting the fitting 10, is fastened to the drive element 21, preferably clipped on. The drive element 21 and the locking ring 43 have in each case a flange which respectively bears on the outer face of one of the two fitting parts 11 or 12, and which acts as a seal.

With a rotation of the drive element 21—counter to the force of the spring arrangement 35—by an angle corresponding to the length of the slot of the control disc 36, which is smaller than the decoupling angle between the drive element 21 and the transmission rod 7, the eccentric 27 driven thereby and the control disc 36 are also rotated. The rotating control disc 36 pulls the bolts 16 radially inwards, i.e. out of the toothed ring 17, whereby the first fitting 10 is unlocked and the two fitting parts 11 and 12 may be rotated relative to one another about the axis A.

An adapter 5a fastened to one of the two fitting parts 11 or 12, in the present case to the second fitting part 12, connects the first fitting 10 to the seat part, while the other fitting part fastened to the structure of the backrest 4, in the present case the first fitting part 11, connects the first fitting 10 to the backrest 4.

A second fitting 50 of the fitting system 5 on the opposing vehicle seat side is also configured as a latching fitting. The components described in the present case for the first fitting 10 are also present in the second fitting 50. Thus the first fitting part 11 and the second fitting part 12 may be locked together and after being unlocked are rotatable relative to one another about the axis A.

The adapter 5a (present on the vehicle seat side with the second fitting 50) is fastened to one of the two fitting parts 11 or 12 of the second fitting 50, in the present case the second fitting part 12, but for connecting to the backrest 4 a third fitting part 53 is provided, which is fastened to the structure of the backrest 4. The third fitting part 53 is rotatably mounted on the other of the two fitting parts 11 or 12, and able to be locked therewith, in the present case therefore to the first fitting part 11. By the elements of a locking device, provided therefor, and the third fitting part 53 (and optionally necessary modifications of the fitting parts 11 or 12) a free-pivoting device 54 associated with the second fitting 50 is defined. The basic construction of such a free-pivoting device 54 is, for example, disclosed in DE 10 2006 044 490 A1 (corresponding to U.S. Pat. No. 7,571,962) for a geared fitting. The free-pivoting device 54 is unlocked independently of the second fitting 50.

An annular latching element 56 on the fitting part 11 or 12 not connected to the adapter 5a, i.e. in the present case the first fitting part 11, serves for the pivotable mounting of the third fitting part 53. To this end, the latching element 56 has, for example, a collar, on which the third fitting part 53 is pivotably mounted with a bearing opening, which may also be configured in the manner of a collar. The latching element 56 is directly or indirectly fixedly connected to the first fitting part 11, for example by means of a laser weld seam (or in a different manner). Optionally, an annular fastening disc is provided which encompasses the third fitting part 53 in the bearing region and is fixedly connected to the latching element 56 and optionally to the associated fitting part 11 (or 12) for axially securing the latter. In the radial direction, a certain bearing clearance is present. The third fitting part 53 may consist of two parts fastened to one another, of which one is mounted on the latching element 56 and the other is connected as an adapter to the backrest 4.

A pawl 60 is pivotably mounted on the third fitting part 53 on the side facing the latching element 56, by means of a bearing pin, hereinafter denoted as the pawl bearing pin 62. For locking and for limiting the forward pivoting movement of the third fitting part 53 in the event of a (front) crash, in the radial extension of the pawl 60 on the latching element 56 a latching stop—which is lug-shaped in the present case—is provided, preferably integrally formed thereon. The pawl bearing pin 62 is configured as an eccentric pin, i.e. it is rotatably mounted relative to the third fitting part about an axis offset to the pivot axis of the pawl 60 in the third fitting part 53. For compensating the manufacturing tolerances, the pawl bearing pin 62 is adjusted and fixed so that the pawl 60 bears against the latching stop of the latching element 56 with maximum pawl engagement without clearance, but outside the angular range of the self-locking.

In order to hold the pawl 60 in latching engagement with the latching element 56, a clamping element 64 and a catch element 66 are provided as locking elements. Parallel to the pawl bearing pin 62, an unlocking shaft 68 is rotatably mounted in the third fitting part 53 by means of a bearing bush 69. The clamping element 64 is pivotably located on the unlocking shaft and the catch element 66 is located fixedly in terms of rotation on the unlocking shaft 68. The catch element 66 and the unlocking shaft 68 may also be of integral configuration. The catch element 66 and the clamping element 64 are pivotable about the common axis defined by the unlocking shaft 68 and aligned with the pawl 60 when the third fitting part 53 is locked. The operation of the catch element 66 and the clamping element 64 is disclosed in DE 44 39 644 A1.

The clamping element 64 bears with a clamping surface which is curved eccentrically relative to the unlocking shaft 68, at an angle outside the self-locking region, against a bearing surface of the pawl 60. The clamping element 64 is pretensioned by a tension spring 71 formed as a spiral spring, so that it acts on the pawl 60 (and tensions said pawl against the latching stop of the latching element 56). As a result, the third fitting part 53 is locked without clearance to the latching element 56 and thus to the first fitting part 11. The catch element 66 is acted upon by a catch spring 73 formed as a helical tension spring, and bears against a stop of the third fitting part 53. In the normal case, i.e. for normal seating use, the pawl 60 is held in position by the clamping element 64, and the catch element 66 is arranged at a short distance from the pawl 60. In the event of a crash, if crash forces act on the pawl 60, the clamping element 64 may open due to the absence of self-locking. After a slight pivoting movement of the pawl 60, said pawl comes to bear against the catch element 66. The catch element 66 thus supports the pawl 60, which bears inside the self-locking region against the catch element 66, preferably tangentially or concentrically and as flat as possible. Thus the pawl 60 is prevented from opening (further).

The catch element 66 and the clamping element 64 are coupled together for take-up, with free travel, preferably by means of a slot-pin guide. To this end, the clamping element 64 has a slot curved about the unlocking shaft 68, in which slot a pin of the catch element 66 engages. A cover 74 fastened to the third fitting part 53 covers the pawl 60 together with the pawl bearing pin 62, the catch element 66, the clamping element 64 and the springs 71 and 73, and protects them from soiling.

As a stop, which is effective in the reverse pivoting direction of the backrest 4 (in FIGS. 5, 6 and 13 clockwise, in FIGS. 3, 4 and 9 anti-clockwise), the third fitting part 53 has at least one first stop cam 75, in the present case two, diagonally opposing one another relative to the axis A and the latching element 56 has second stop cams 76 in the same number and in a corresponding arrangement. Each first stop cam 75, which has a first stop surface facing in the reverse pivoting direction, cooperates with just one second stop cam 76, which has a second stop surface facing in the forward pivoting direction (in FIGS. 3, 4 and 9 clockwise, and in FIGS. 5, 6 and 13 anti-clockwise). The stop cams 75 and 76 distributed in pairs in the peripheral direction are arranged radially spaced apart from the axis A, are formed by an axial tongue-shaped projection in the material facing one another and, with their stop surfaces located on the front face at the free end of the tongues, face one another in the peripheral direction.

The stop cams 75 and 76 do not protrude radially over the outer edge of the associated component, but only axially, i.e. they are arranged radially within the outer edge of the associated component. The stop cams 75 and 76 are designed so that they protrude with their stop surfaces as far as possible into the intermediate space which is preferably present between the third fitting part 53 and the latching element 56. The projections have the effect that on the respective rear face a recess is produced in the material. The stop surfaces extend in the axial and radial direction, i.e. without components in the peripheral direction, so that when coming into contact they may optimally transmit the forces. The stop formed by the stop cams 75 and 76 defines the pivoting movement of the third fitting part 53 on one side to the rear, and namely both in the normal case after the free pivoting and in the event of a (rear) crash.

For unlocking the free-pivoting device 54 at the start of the free pivoting, the unlocking shaft 68 is rotated about its own axis. The unlocking shaft 68 drives the catch element 66 in order to open it, i.e. it separates and/or removes it from the pawl 60. Thus the catch element 66 drives the clamping element 64 by means of the slot-pin guide, in order to release the pawl 60. The pivoting catch element 66 comes to bear against a substantially radially protruding unlocking finger of the pawl 60 and pulls said pawl as a result and/or supports said pawl when opened. The pawl 60 is thus fully opened.

In order to limit the adjusting range when adjusting the inclination, i.e. to limit the relative rotation of the two fitting parts 11 and 12, an end stop 77 protrudes from the adapter 5a parallel to the axis A, which is received between two limit stops of the latching element 56. By cooperating with a corresponding limit stop on the third fitting part 53, the end stop 77 may also limit the free pivoting of the backrest 4, i.e. the pivoting movement of the third fitting part 53 to the front.

The two fittings 10 and 50 of the fitting system 5 are coupled by means of the transmission rod 7 as a first transmission element for the inclination adjustment of the backrest 4. The rigid, profiled transmission rod 7 is received by the respective drive element 21, and namely in the present case by means of a splined profile coupled for take-up. For the free pivoting, the first fitting 10 and the free-pivoting device 54 are coupled by means of a transmission tube 80 as a second transmission element. The rigid, hollow cylindrical transmission tube 80 is aligned with the axis A and encompasses the (also hollow) transmission rod 7 with a radial spacing ("tube-in-tube"). The transmission tube 80 is rotatably mounted on the fittings 10 and 50 at both of its ends in a manner disclosed in more detail below and connected fixedly in terms of rotation to the drive element 21 of the first fitting 10.

The transmission tube 80 is controlled by means of a first lever element 81 which is arranged on the side of the second fitting 50 facing inwards and is located fixedly in terms of rotation on the unlocking shaft 68, a second lever element 82, which—in the vicinity of the second fitting 50—is located fixedly in terms of rotation on the transmission tube 80, for example welded thereto, and a coupling element 83 which is provided between the first lever element 81 and the second lever element 82. The two lever elements 81 and 82 and the coupling element 83 are individually connected to one another in a rigid and articulated manner and/or with free travel. At its other end, the transmission tube 80 is connected fixedly in terms of rotation—or at least coupled for take-up in the opening direction—with the drive element 21 of the first fitting 10. The transmission rod 7, on the other hand, is coupled there with the already disclosed free travel to the drive element 21 of the first fitting 10. The free travel is optional in the drive element 21 of the second fitting 50. Here, a connection between the drive element 21 and transmission rod 7, which is fixed in terms of rotation in both rotational directions, may also be provided.

Corresponding to the two functions of the fitting system 5, two operating elements are provided. A first operating element 91, for example a lever, a hand wheel or a strap is located—axially outside the two fittings 10 and 50—fixedly in terms of rotation on the transmission rod 7 or acts thereupon—at least indirectly—with a torque. If the first operating element 91 is moved, in particular is pivoted upwards, the transmission rod 7 rotates about the axis A, in FIGS. 5, 6 and 13 clockwise, and in FIGS. 3, 4 and 9 anti-clockwise. In both fittings 10 and 50, the drive element 21 is immediately driven, whereupon in each case the eccentric 27 and the control disc 36 are rotated and the bolts 16 are pulled radially inwards. The backrest 4 may thus be pivoted into a different use position. If the desired new inclination of the backrest 4 is reached, the first operating element 91 is released, whereupon the spring arrangements 35 in each case pull back the eccentric 27 and thus, on the one hand, force the bolts 16 radially outwards, so that they engage in the toothed ring 17, and, on the other hand, rotate back the drive element 21 and the transmission rod 7.

A second operating element 92, which is preferably arranged in the upper region of the backrest 4, is operatively connected by means of a cable control to the free-pivoting device 54 associated with the second fitting 50, for example to the first lever element 81 or a further lever, which is located fixedly in terms of rotation on the unlocking shaft 68. If the second operating element 92 is moved, in particular is pulled upwards, on the one hand, the free-pivoting device 54 is unlocked and, on the other hand, the first lever element 81 is pivoted. The pivoting first lever element 81 acts upon the coupling element 83 (for example configured as a pull rod or push rod) which in turn acts upon the second lever element 82 which in turn rotates the transmission tube 80.

Figure 13:
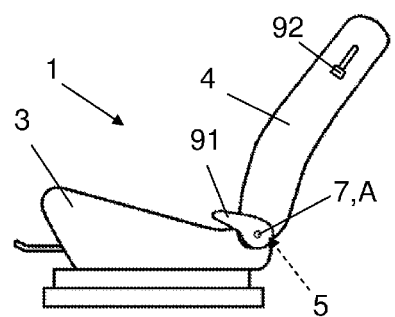
FIG. 13 is a schematic view of a vehicle seat according to the invention.

The rotating transmission tube 80, rotates the drive element 21 of the first fitting part 10 connected fixedly in terms of rotation to the transmission tube 80, clockwise in FIGS. 6 and 13, and anti-clockwise in FIGS. 3 and 9, so that—as disclosed before—the first fitting 10 is unlocked. As the rotating drive element 21 now runs ahead relative to the transmission rod 7, the free travel between the drive element 21 and the transmission rod 7 is passed through, i.e. the transmission rod 7 remains unrotated in its initial position. As a result, the drive element 21 of the second fitting 50 also remains unrotated, so that the second fitting 50 remains locked.

With the unlocked first fitting 10 and the unlocked free-pivoting device 54, the backrest 4—with the locked second fitting 50—may be freely pivoted to the front. If the backrest 4 is pivoted back, and the previously adopted use position is reached, the free-pivoting device 54 is locked, whereby the first lever element 81 is again pivoted back, so that the transmission tube 80 and the drive element 21 may rotate back, and thus the first fitting 10 is again locked.

To this extent, the two exemplary embodiments are the same, in particular with regard to the function when freely pivoted. However there are differences in the mounting of the transmission tube 80, which are described below.

In the first exemplary embodiment on the side of the first fitting 10 on the transmission tube 80 a (profiled) widening 101 is formed, by means of which the transmission tube 80 is pushed fixedly in terms of rotation onto the drive element 21, in other words onto the flange of the drive element 21 present on this side of the first fitting 10. The securing in the peripheral direction is carried out in the present case by a positive connection. By being pushed on, axial tolerances may also be compensated. On the side of the second fitting 50 on the drive element 21 a bushing 102—aligned with the axis A—is attached at that point fixedly in terms of rotation, preferably clipped on. The transmission tube 80 is rotatably mounted in this bushing 102. Thus axial securing may be provided by the bushing 102 engaging with radially inwardly facing material parts in bores of the transmission tube 80, in particular being clipped in, a clearance corresponding to the decoupling angle being provided in the peripheral direction. A slot-pin guide between the coupling element 83 and the first lever element 81 (or alternatively the second lever element 82) uncouples the free-pivoting device 54 from the rotary movement of the drive element 21 of the first fitting 10 when unlocked for adjusting the inclination.

In the second exemplary embodiment, a clip 120 is fastened, preferably welded, on the two sides of the fittings 10 and 50 facing one another, in each case on the fitting part connected to the adapter 5a. In each case, one end of a backrest compensation spring 122 formed as a torsion bar spring is suspended on the clips 120, the other, opposing end of said backrest compensation spring being suspended on the structure of the backrest 4 or on the third fitting part 53. On the side of the first fitting 10 on the drive element 21 a drive element extension 124—aligned with the axis A—is fastened, preferably clipped on, or at least attached fixedly in terms of rotation. The transmission tube 80 is connected fixedly in terms of rotation to this drive element extension 124, for example by (two) projections of the drive element extension 124 engaging in (two) recesses at the end of the transmission tube 80.

On the opposing side on the second fitting 50 a bearing element 126 is provided which rotatably mounts—in a corresponding receiver—the transmission tube 80, and in turn is mounted in the clip 120 at that point. Thus the mounting element 126 is slotted in an axial manner in order to be able to mount the transmission tube 80 more easily. The axial tolerance compensation may take place within the bearing element 126. The bearing element 126 is penetrated by the transmission rod 7, which exits the bearing element 126 at an opening, the diameter thereof being smaller than that of the receiver for the transmission tube 80.

While specific embodiments of the invention have been described in detail to illustrate the application of the principles of the invention, it will be understood that the invention may be embodied otherwise without departing from such principles.

List of Reference Numerals

| List of reference numerals | |
|---|---|
| 1 | Vehicle seat |
| 3 | Seat part |
| 4 | Backrest |
| 5 | Fitting system |
| 5a | Adapter |
| 7 | Transmission rod, first transmission element |
| 10 | First fitting |
| 11 | First fitting part |
| 12 | Second fitting part |
| 13 | Clamping ring |
| 13a | Slide ring |
| 14 | Guide segment |
| 16 | Bolt |
| 17 | Toothed ring |
| 21 | Drive element |
| 27 | Eccentric |
| 35 | Spring arrangement |
| 36 | Control disc |
| 38 | Lug |
| 43 | Locking ring |
| 50 | Second fitting |
| 53 | Third fitting part |
| 54 | Free-pivoting device |
| 56 | Latching element |
| 60 | Pawl |
| 62 | Pawl bearing pin |
| 64 | Clamping element |
| 66 | Catch element |
| 68 | Unlocking shaft |
| 69 | Bearing bush |
| 71 | Tension spring |
| 73 | Catch spring |
| 74 | Cover |
| 75 | First stop cam |
| 76 | Second stop cam |
| 77 | End stop |
| 80 | Transmission tube, second transmission element |
| 81 | First lever element |
| 82 | Second lever element |
| 83 | Coupling element |
| 91 | First operating element |
| 92 | Second operating element |
| 101 | Widening |
| 102 | Bushing |
| 120 | Clip |
| 122 | Backrest compensation spring |
| 124 | Drive element extension |
| 126 | Bearing element |
| A | Axis |

What is claimed is:

1. A fitting system for a vehicle seat, the fitting system comprising:
   a first fitting;
   a second fitting;
   a first transmission element acting between the two fittings;
   a free-pivoting device assigned to the second fitting;
   a first operating element, the actuation of the first operating element unlocking the two fittings by using the first transmission element;
   a second operating element for free pivoting, the actuation of the second operating element unlocking the first fitting and the free-pivoting device; and
   a second transmission element arranged and mounted between the two fittings on the fittings, the second transmission element acting independently of the first transmission element between the free-pivoting device and the first fitting, wherein one of the first transmission element and the second transmission element comprises a transmission rod and the other of the first transmission element and the second transmission element comprises a transmission tube, said transmission tube enclosing said transmission rod along an entire length of said transmission rod between said first fitting and said second fitting.

2. A fitting system according to claim 1, wherein:
   each of the fittings comprise fitting parts which are pivotable relative to one another about an axis; and
   each of the first transmission element and the second transmission element is rotatable about the axis.

3. A fitting system according to claim 2, wherein each of the fittings comprise a drive element which is rotatable about the axis, the first fitting drive element and the second fitting drive element rotatably mounting the first transmission element about the axis.

4. A fitting system according to claim 3, wherein a rotational movement is transmitted between the drive element of the first fitting and the first transmission element in both rotational directions with limited free travel in one rotational direction.

5. A fitting system according to claim 3, wherein the second transmission element is connected at least one of fixedly in terms of rotation and coupled for take-up to the drive element of the first fitting via a drive element extension.

6. A fitting system according to claim 3, wherein:
   upon actuation of the first operating element, the first transmission element is rotated and rotates the drive elements of the two fittings; and
   upon actuation of the second operating element the free-pivoting device is unlocked, the first transmission element remains unrotated, and the second transmission element rotates and rotates the drive element of the first fitting.

7. A fitting system according to claim 3, wherein:
   the second transmission element is one of rotatably mounted on a drive element of the second fitting, in a bushing connected to drive element of the second fitting and rotatably mounted on the second fitting, in a clip connected to the second fitting by interposition of a bearing element slotted in an axial manner.

8. A fitting system according to claim 1, wherein the second actuating element acts on the free-pivoting device, which by means of a first lever element forming a coupling element and a second lever element which are individually connected to one another in a rigid and articulated manner, controls the second transmission element.

9. A fitting system according to claim 1, wherein:
   each of the fittings comprise fitting parts which are pivotable relative to one another about an axis; and
   each of the first transmission element and the second transmission element is rotatable about the axis.

10. A motor vehicle seat comprising:
    a seat part;
    a backrest; and
    a fitting system for adjusting an inclination of the backrest and for freely pivoting the backrest relative to the seat part, the fitting system comprising:
    a first fitting;
    a second fitting;
    a first transmission element acting between the first fitting and the second fitting;
    a free-pivoting device associated with the second fitting;
    a first operating element for adjusting the inclination of the backrest, the actuation of the first operating element unlocking the two fittings via the first transmission element;
    a second operating element for free pivoting of the backrest, the actuation of the second operating element unlocking the first fitting and the free-pivoting device; and
    a second transmission element arranged and mounted between the first fitting and the second fitting and connected to the first fitting and the second fitting, the second transmission element acting independently of the first transmission element between the free-pivoting device and the first fitting, one of the first transmission element and the second transmission element comprising a transmission rod and the other of the first transmission element and the second transmission element comprises a transmission tube, said transmission rod having a transmission rod portion bridging a gap between said first fitting and said second fitting, said transmission tube surrounding an entire length of said transmission rod portion.

11. A motor vehicle seat according to claim 10, wherein:
    each of the fittings comprise fitting parts which are pivotable relative to one another about an axis; and
    each of the first transmission element and the second transmission element is rotatable about the axis.

12. A motor vehicle seat according to claim 11, wherein:
    the first fitting comprises a first fitting drive element which is rotatable about the axis;
    the second fitting comprises a second fitting drive element which is rotatable about the axis;
    the first transmission element being mounted to the first fitting drive element and the second fitting drive element for rotation about the axis.

13. A motor vehicle seat according to claim 12, wherein a rotational movement is transmitted between the first fitting drive element and the first transmission element in both rotational directions with limited free travel in one rotational direction.

14. A motor vehicle seat according to claim 12, wherein the second transmission element is connected at least one of fixedly in terms of rotation and coupled for take-up to the first fitting drive element.

15. A motor vehicle seat according to claim 12, wherein:
    upon actuation of the first operating element, the first transmission element is rotated and rotates the first fitting drive element and the second fitting drive element; and
    upon actuation of the second operating element the free-pivoting device is unlocked, the first transmission element remains unrotated, and the second transmission element rotates and rotates the first fitting drive element.

16. A motor vehicle seat according to claim 12, wherein: the second transmission element is at least one of rotatably mounted to the second fitting drive element and rotatably mounted to the second fitting.

17. A motor vehicle seat according to claim 10, further comprising:
a first lever element;
a second lever element connected to the first lever element in a rigid and articulated manner wherein the second actuating element acts on the free-pivoting device via the first lever element and the second lever element to control the second transmission element.

18. A motor vehicle seat according to claim 10, wherein:
each of the fittings comprise fitting parts which are pivotable relative to one another about an axis; and
each of the first transmission element and the second transmission element is rotatable about the axis.

19. A fitting system for a vehicle seat, the fitting system comprising:
a first fitting;
a second fitting;
a first transmission element acting between the two fittings;
a free-pivoting device assigned to the second fitting;
a first operating element, the actuation of the first operating element unlocking the two fittings by using the first transmission element;
a second operating element for free pivoting, the actuation of the second operating element unlocking the first fitting and the free-pivoting device; and
a second transmission element arranged and mounted between the two fittings on the fittings, the second transmission element acting independently of the first transmission element between the free-pivoting device and the first fitting, one of the first transmission element and the second transmission element comprising a transmission rod and the other of the first transmission element and the second transmission element comprising a transmission tube, said transmission rod having a transmission rod portion extending between said first fitting and said second fitting, said transmission tube surrounding an entire length of said transmission rod portion, wherein at least a portion of said transmission tube and said transmission rod bridge a gap between said first fitting and said second fitting.

20. A fitting system according to claim 19, wherein:
each of the fittings comprise fitting parts which are pivotable relative to one another about an axis; and
each of the first transmission element and the second transmission element is rotatable about the axis.

* * * * *